United States Patent [19]

Madsen et al.

[11] 4,401,632

[45] Aug. 30, 1983

[54] RECOVERY OF ARSENIC FROM FLUE DUST

[75] Inventors: Brent W. Madsen, Bountiful; Henry Dolezal; Philip A. Bloom, both of Salt Lake City; Monte B. Shirts, South Jordan, all of Utah

[73] Assignee: The United States of America as represented by the Secretary of the Interior, Washington, D.C.

[21] Appl. No.: 348,118

[22] Filed: Feb. 11, 1982

Related U.S. Application Data

[63] Continuation of Ser. No. 225,238, Jan. 15, 1981, abandoned.

[51] Int. Cl.³ .............................................. C01G 28/00
[52] U.S. Cl. ...................................... 423/87; 423/99; 423/617; 75/25; 75/101 R; 75/121

[58] Field of Search ................... 423/87, 88, 601, 617, 423/99, 106, 109, 41; 75/25, 101 R, 120, 121

[56] References Cited

U.S. PATENT DOCUMENTS

| | | | |
|---|---|---|---|
| 1,148,522 | 8/1915 | Martin et al. | 423/87 X |
| 1,180,765 | 4/1916 | Durant | 423/106 |
| 1,921,706 | 8/1933 | Schopper | 423/87 |
| 1,952,290 | 3/1934 | Schopper | 423/87 |
| 3,149,964 | 9/1964 | Schwartz | 75/25 |

Primary Examiner—Earl C. Thomas
Attorney, Agent, or Firm—William S. Brown

[57] ABSTRACT

Arsenic is recovered from flue dusts by forming an aqueous slurry of the dust, treating the slurry with $SO_2$ gas to solubilize arsenic, and precipitating the arsenic as $As_2O_3$ by means of sulfuric acid.

1 Claim, No Drawings

RECOVERY OF ARSENIC FROM FLUE DUST

This is a continuation of application Ser. No. 225,238 filed Jan. 15, 1981 and now abandoned.

This invention relates to recovery of arsenic, and byproduct elements such as zinc, copper, cadmium and indium, from flue dusts, particularly flue dusts from smelter operations.

Conventional processes for recovery of arsenic from smelter flue dusts are complicated and relatively inefficient. Such processes include combination of the flue dust with pyrite or galena and roasting in a reverberatory furnace, with crude arsenic trioxide ($As_2O_3$) being condensed from the roasting furnace gases and collected in cooling flues, baghouses, or Cottrell precipitators. Most of the $As_2O_3$ product is utilized in crude form, but if a higher purity is required the operation must be repeated as often as necessary. Such pyrometallurgical processes are thus generally inefficient and environmentally undesirable.

It has now been found, in accordance with the invention, that a substantially more efficient and environmentally acceptable recovery of arsenic from flue dusts may be achieved by means of a hydrometallurgical process in which an aqueous slurry of the flue dust is treated with sulfur dioxide gas to solubilize the arsenic, with subsequent precipitation of the arsenic as $As_2O_3$ by means of sulfuric acid.

The invention is applicable, in general, to arsenical flue dusts, i.e., those containing arsenic, usually in amounts of about 10 to 30 percent by weight. The dusts may, however, contain various other metals such as zinc, copper, cadmium and indium. Examples of such dusts are lead smelter, copper reverberatory and flash smelting flue dusts.

An aqueous slurry of the dust, containing about 5 to 25 weight percent dust, is initially formed by conventional means, preferably by feeding the dust into an agitated aqueous solution through a closed feed system in order to minimize airborne dust. The slurry is then treated with $SO_2$ gas, by conventional means such as sparging the gas through the slurry, in order to solubilize the arsenic in the flue dust. The amount of $SO_2$ employed should be at least the stoichiometric amount necessary to react with the arsenic in the slurry, whereby the pentavalent arsenic in the dust is reduced to the trivalent state according to the equation:

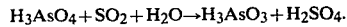

$$H_3AsO_4 + SO_2 + H_2O \rightarrow H_3AsO_3 + H_2SO_4.$$

Rate of addition of the $SO_2$ should be sufficient to maintain a slight positive pressure, e.g., about 3300 pascals, of $SO_2$ within the reaction vessel. The rate of $SO_2$ addition required to maintain this pressure drops continuously as the reaction progresses and is nearly zero after about an hour.

The $SO_2$ is preferably added as a pure gas but can be added in combination with a carrier gas such as air or nitrogen. At ambient pressure, dilute gaseous mixtures containing only a few percent $SO_2$ can be used at lower temperatures, e.g., as low as 0° C., where the solubility of $SO_2$ is higher. At higher temperatures, e.g., up to about 90° C., however, a concentrated gaseous mixture containing a high percentage of $SO_2$, e.g., greater than about 90 percent $SO_2$, must be used for effective reduction of arsenic to the trivalent state. Thus, suitable leach temperatures may vary from about 0° C. to 90° C. Although ambient pressure is usually satisfactory, use of an autoclave to provide pressures up to about 5 atmospheres may sometimes be advantageous.

Solids are then filtered from the leach solution and the solution is mixed with concentrated, e.g., about 95 to 98 percent, sulfuric acid in order to lower the solubility of the trivalent arsenic. The amount of acid employed should be sufficient to provide a solution that is about 30 to 50 percent acid. Addition of the acid raises the temperature of the leach solution, generally to about 75° to 90° C. When the solution is cooled to at least approximately 25° C., preferably about 0° to 10° C., pure arsenic trioxide crystals precipitate, whereby about 50 to 80 percent of the arsenic in the original flue dust is recovered as $As_2O_3$. The $As_2O_3$ product is filtered from the solution and the filtrate, generally containing only about 3 to 5 grams per liter of arsenic, may be treated with hydrated titanium dioxide granules for absorption of all, or a major portion, of the arsenic remaining in solution. Or, alternatively, the filtrate may be used to releach the residue for recovery of additional minor amounts of arsenic. Treatment with hydrated titanium dioxide is generally best accomplished by trickling the filtrate solution through a tower containing the dioxide. The arsenic can be stripped from the titanium dioxide by passing a solution of sodium hydroxide through the tower. Sodium arsenite can then be recovered from the resulting strip solution as a marketable by-product.

If the flue dust contains zinc, this metal is also leached from the dust by means of the $SO_2$ treatment of the aqueous slurry of the dust. The zinc is not, however, precipitated by means of the sulfuric acid or absorbed on the titanium dioxide, a separation of arsenic and zinc thereby being obtained. The zinc may be recovered as zinc sulfate by crystalization after evaporation of excess water, or as metallic zinc by electrowinning.

The residue from the $SO_2$ leach can be further processed by leaching at a pH of about 0 to 1 and a temperature of about 80° to 100° C., preferably about 100° C., with fresh sulfuric acid solution, preferably about 20 to 30 percent, or with the above-mentioned filtrate from the $As_2O_3$ precipitation. This leach will dissolve most of the indium, if present, some of the copper, and most of the small amounts of arsenic and zinc remaining in the residue from the $SO_2$ leach. The levels of arsenic and zinc remaining in the final residue are low and in the acceptable range for feed to a lead smelter. Indium and copper contained in the acid leach solution can be recovered by conventional means, such as solvent extractionelectrowinning, and the solution can then be combined with the main leach stream at the point where it is treated with hydrated titanium dioxide to absorb most of any remaining arsenic.

It has also been found that when a dilute gaseous $SO_2$ mixture, e.g., one containing about 6 percent $SO_2$ and 94 percent air, is employed it is frequently advantageous to perform the arsenic leaching and reduction in two stages. In this procedure, the slurry is first cooled to about 0° C. and sparged with the dilute gas. At this low temperature, $SO_2$ is selectively absorbed into the liquor because its solubility at low temperatures is increased to a greater extent than that of oxygen and nitrogen. Some leaching takes place during the sparging, but the reduction of pentavalent arsenic is not complete because of the slow kinetics at the low temperature. The slurry is then heated to a temperature of about 85° to 95° C., and in this second stage absorbed $SO_2$ reacts with pentavalent arsenic to complete the reduction to the trivalent state. The solution is then treated with sulfuric acid, etc., as described above.

The invention will be more specifically illustrated by the following examples.

EXAMPLE 1

Two hundred-fifty grams of a copper smelter flue dust, containing in percent, 25.9 arsenic, 15.7 zinc, 4.06 copper, and 1.31 iron, was slurried in 1 liter of water and heated to 95° C. The slurry was then sparged at that temperature with a essentially pure $SO_2$ for 1 hour, filtered, and washed. Enough 96 percent sulfuric acid was added to the filtrate to give a 50 percent acid solution. This solution was cooled to 20° C. to crystallize out arsenic trioxide. The leach residue was releached at 115° C. for 1 hour with a sulfuric acid solution at a pH of 0.5.

The sulfur dioxide leach dissolved 80 percent of the arsenic and 87 percent of the zinc, but none of the copper. Addition of sulfuric acid to the leach filtrate, followed by cooling, resulted in 82 percent arsenic recovery as pure arsenic trioxide crystals. Releaching the residue dissolved an additional 9 percent of the zinc and 12 percent of the arsenic, as well as 20 percent of the copper, contained in the flue dust residue. Total extractions of 99.5 and 96.0 percent of the arsenic and zinc, respectively, were achieved with the final leach residue containing, in percent, 0.42 arsenic, 2.2 zinc, 11.0 copper, and 0.66 iron.

EXAMPLE 2

The procedure of example 1 was followed except that a dust from a lead-zinc smelter that contained, in percent, 15.5 arsenic, 4.7 zinc, and 0.37 indium was treated in a 2-hour sulfur dioxide leach. The resulting residue was not further acid leached.

The sulfur dioxide leach dissolved 76.4 percent of the arsenic, 82.9 percent of the zinc, and none of the indium. Addition of the sulfuric acid to the leach filtrate and subsequent cooling to 25° C. caused 60.6 percent of the dissolved arsenic to precipitate as pure arsenic trioxide crystals.

EXAMPLE 3

One hundred grams of the lead-zinc smelter flue dust used in example 2 was slurried with 1 liter of water, and the slurry was sparged with the gaseous mixture of example 1 for 1 hour at 25° C. The leached slurry was then filtered and washed. The leach residue was then leached again with a sulfuric acid solution of pH 0 at 95° C. for 1 hour.

The sulfur dioxide leach dissolved 84.5 percent of the arsenic and 95.3 percent of the zinc. The acid leach dissolved additional metal values from the residue. The total extraction for the two-stage leaching was 95.4, 99.3, and 83.1 percent for arsenic, zinc, and indium, respectively.

EXAMPLE 4

Two hundred grams of the lead-zinc smelter flue dust used in example 2 was slurried with 800 milliliters of water and sparged with a gas containing 6 percent sulfur dioxide and 94 percent air at 0° C. The total gas flow was 19.15 liters per minute for 2 hours. The slurry was then heated to 90° C. for 1 hour and then filtered and washed with water. Sulfuric acid was added to the filtrate solution to bring the acid concentration to 50 percent. This acid solution was then cooled to 25° C., thereby precipitating arsenic trioxide crystals.

The sulfur dioxide leach dissolved 82.1 percent of the arsenic, 90.5 percent of the zinc, and insignificant amounts of the indium. In the crystallization step, 70 percent of the dissolved arsenic was precipitated as pure arsenic trioxide crystals, resulting in a solution that contained, in grams per liter, 5.6 arsenic, 4.1 trivalent arsenic, and 7.4 zinc.

We claim:

1. A process for removal and recovery of arsenic from arsenical flue dusts comprising: (1) forming an aqueous slurry of the flue dust, (2) treating said slurry with sulfur dioxide gas to reduce and solubilize arsenic, (3) filtering to separate insoluble residue, (4) treating the filtrate with sulfuric acid in an amount sufficient to provide a solution of about 40 to 50 percent acid, (5) cooling the solution to about 25° C. or less to precipitate arsenic trioxide, (6) filtering to separate the arsenic trioxide, and (7) treating the filtrate from step (6) with granules of hydrated titanium dioxide to absorb additional arsenic.

* * * * *